D. W. HAYDEN.

Stopping-Mechanisms for Drawing-Frames.

No. 6,147. Reissued Nov. 24, 1874.

Witnesses.
Philip R. Larner
Andrew R. Cauldwell

Inventor.
Daniel W. Hayden,
By Munn & Co.
Associate Attorney.

THE GRAPHIC CO. PHOTO-LITH. 39 & 41 PARK PLACE, N.Y.

UNITED STATES PATENT OFFICE.

DANIEL W. HAYDEN, OF PROVIDENCE, RHODE ISLAND.

IMPROVEMENT IN STOPPING MECHANISMS FOR DRAWING-FRAMES.

Specification forming part of Letters Patent No. 123,826, dated February 20, 1872; reissue No. 5,966, dated July 14, 1874; reissue No. 6,147, dated November 24, 1874; application filed November 3, 1874.

*To all whom it may concern:*

Be it known that I, DANIEL W. HAYDEN, formerly of Wauregan, State of Connecticut, but now of Providence, in the county of Providence and State of Rhode Island, have invented certain new and useful Improvements in Stop-Motions for Drawing-Frames; and I do hereby declare that the following specification, taken in connection with the drawings making a part of the same, is a full, clear, and exact description thereof.

My invention consists of a combination, with the drop-catch lever and trumpet, and the stop-wheel heretofore used for throwing off the belt for stopping the machine when the end or "sliver" breaks, of a supplemental stop-catch, which latter is thrown into contact with the stop-wheel, to stop the machine in case the trumpet is pulled down by knots or bunches on the sliver clogging it.

Figure 1:
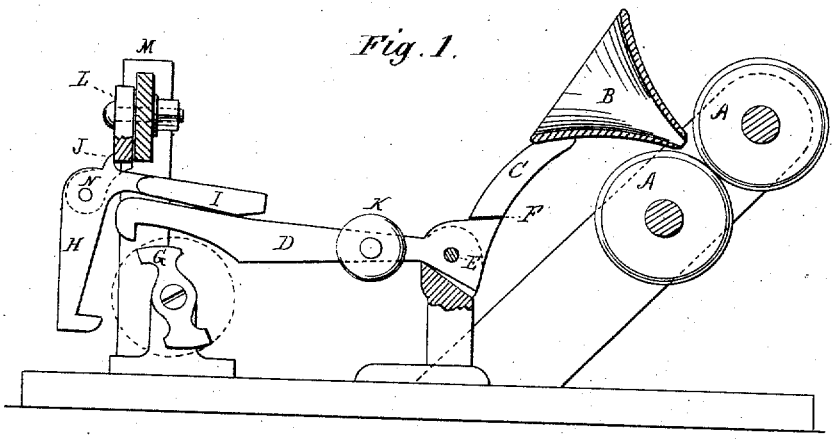
Figure 2:
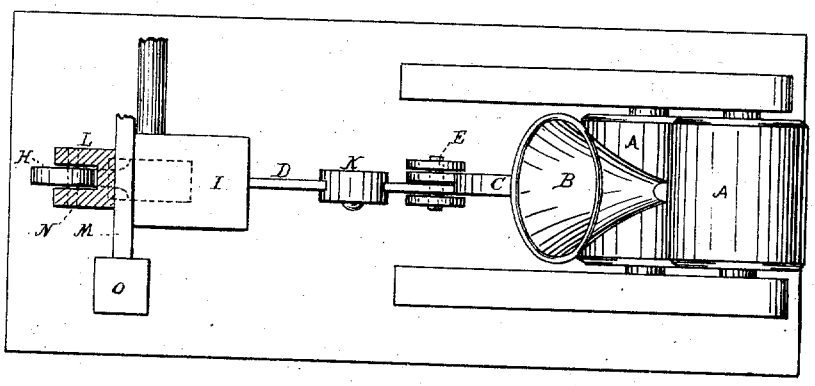

Figure 1 is a longitudinal sectional elevation of my improved stop-motion; and Fig. 2 is a top view, partly in place, and partly in section.

The arrangement shown in the drawing permits the improvement to be applied to any drawing-frame of ordinary construction without the necessity of making alterations or changes in the organization of the machine.

A represents the calender-rollers, and B the trumpet, which is mounted on the arm C. D is the weighted catch-arm, which, with the arm C, (both being pivoted at E, and combined together by the shoulder F on C bearing on the toe or end of D,) constitutes the weighted catch-lever, commonly used in connection with the stop-wheel G for throwing the belt off when the sliver or end breaks. Now, for also stopping the machine by throwing off the driving-belt in case a knot, bunch, snarl, or other defect on the sliver occurs which it is desirable to arrest and remove, and which cannot readily pass through the trumpet, I combine the supplemental stop-catch lever H I with the said arm D and the wheel G, as shown plainly at Fig. 1, so that the elevation of the free end of the arm D above its normal position, and which will take place whenever there is any undue strain on the trumpet by reason of a knot or bunch choking it, will throw up the arm I, and cause the catch end of the arm H to engage with the stop-wheel G, and, by arresting the rotation of the latter, cause the belt to be shifted from the fast to the loose pulley by a mode of operation similar to that which results when, upon the breaking of the sliver, the catch on the lever D comes into engagement with the stop-wheel G. I arrange the supplemental catch-lever so that its heavier arm I shall prevent the lever D from rising high enough by the friction of the sliver on the trumpet, when working properly, to cause the catch H to engage with the wheel G. The weight of the arm I is in excess of the strain of the sliver; but its range of movement downward is limited by the stop J, and does not tend to depress the lever D below what should be its proper position when the sliver is passing freely through the trumpet. The arm I can, however, be lifted readily whenever the strain is so great by reason of the choking of the trumpet as to raise the lever D and overcome the weight, which otherwise furnishes all the needed resistance to strains upon the trumpet-lever produced by slight variations in the evenness of the sliver not sufficiently objectionable to require the machine to be stopped.

The resistance to be overcome to operate the stop-catch H I may be regulated, to a considerable extent, by the adjustable weight K on arm D, which may be put on arm I, if preferred, or it may be dispensed with altogether.

It will thus be seen that the characteristic feature of my improvement is, that the trumpet-lever of a drawing-frame, while subjected to ordinary strains from the sliver passing through the trumpet, is prevented from yielding to such strains and tilting upward by means of a counteracting weight, which may be adjusted to the required degree of resistance; but in case such strains are produced by too objectionable bunches, knots, or snarls in the sliver, which choke the trumpet and produce a strain sufficient to overcome the counter resistance of the arm I, a supplemental catch will engage with the stopping-gear G of the drawing-frame and stop the machine.

In this example of my invention I have represented a forked bracket, L, bolted to the cross-piece M, for supporting the pivot N, on which the catch I H is suspended, and this is all I have to provide for attaching it, for the cross-bar M and the posts O for supporting it are used on drawing-frames for supporting the stop-motion employed for stopping the machine when the cans become empty. Other contrivances for supporting it may be used, if preferred.

What I claim as my invention, and desire to secure by Letters Patent, is—

1. The combination, in a drawing-frame, of the following instrumentalities, to wit: A trumpet-lever, C D, a supplemental stop-catch, H I, operated by the said trumpet-lever whenever the trumpet becomes choked, and the stopping-gear G of the machine, the latter being controlled by the trumpet-lever and the supplemental stop-catch, substantially as described, for the purposes set forth.

2. The combination of the hinged arm I, furnished with a stop, J, with the arm D of the trumpet-lever, for the purpose of affording a sufficient resistance to the varying strains incident to the passage of the yarn through the trumpet not requiring the stoppage of the machine.

DANIEL W. HAYDEN.

Witnesses:
CHARLES SELDEN,
EZRA D. FOGG.